United States Patent
Cai et al.

(10) Patent No.: US 8,161,312 B2
(45) Date of Patent: *Apr. 17, 2012

(54) PROCESSING DATA USING MULTIPLE LEVELS OF POWER CONTROL

(75) Inventors: Mike M. Cai, Newark, CA (US); J D Allegrucci, Sunnyvale, CA (US)

(73) Assignee: Vivante Corporation, Sunnyvale, CA (US)

( * ) Notice: Subject to any disclaimer, the term of this patent is extended or adjusted under 35 U.S.C. 154(b) by 289 days.

This patent is subject to a terminal disclaimer.

(21) Appl. No.: 12/477,652

(22) Filed: Jun. 3, 2009

(65) Prior Publication Data

US 2010/0131786 A1    May 27, 2010

(51) Int. Cl.
*G06F 1/04* (2006.01)
*G06F 1/32* (2006.01)

(52) U.S. Cl. .................... 713/500; 713/300; 713/320

(58) Field of Classification Search .............. 713/300, 713/500

See application file for complete search history.

(56) References Cited

U.S. PATENT DOCUMENTS

| | | | |
|---|---|---|---|
| 6,721,892 B1 * | 4/2004 | Osborn et al. ............... 713/300 |
| 7,356,726 B2 * | 4/2008 | Shimoyama et al. ......... 713/600 |
| 7,464,276 B2 * | 12/2008 | Rusu et al. .................... 713/300 |
| 2007/0200593 A1 * | 8/2007 | Agarwal et al. ................ 326/38 |

* cited by examiner

*Primary Examiner* — Nitin Patel
(74) *Attorney, Agent, or Firm* — David R. Stevens; Stevens Law Group

(57) ABSTRACT

An apparatus and method is provided for data processing where power is automatically controlled with a feed back loop with the host processor based on the internal work load characterized by performance counters. The host automatically adjusts internal frequencies or voltage level to match the work load. The feedback loop allows tuning of frequency or voltage controlling power dissipation.

18 Claims, 3 Drawing Sheets

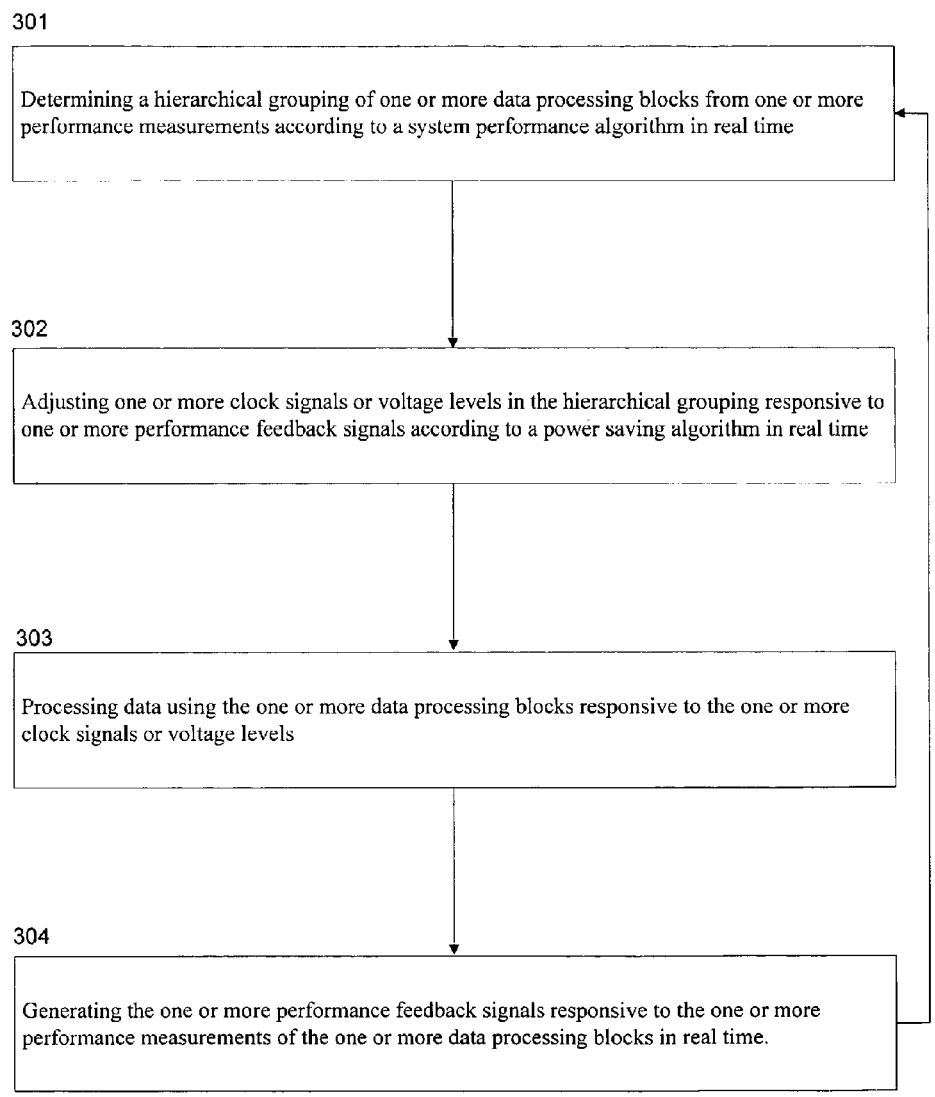

PROCESSING DATA USING MULTIPLE LEVELS OF POWER CONTROL

CROSS REFERENCE TO RELATED APPLICATIONS

The present invention is related and claims priority to U.S. patent application, Ser. No. 11//450,737, entitled "A Single Chip 3D and 2D Graphics Processor with Embedded Memory and Multiple Levels of Power Controls" and filed on Jun. 9, 2006, issued on Jul. 14, 2009, bearing U.S. Pat. No. 7,562,245. The U.S. Patent Application is hereby incorporated by reference in its entireties.

FIELD OF INVENTION

The invention related generally to the field of computer systems and more particularly to power control for graphics processor.

DESCRIPTION OF RELATED ART 3D and 2D graphics processors of various sizes and shapes are typically designed with clock gating at lowest level. To reduce power consumption, clocks to an entire block of circuitry are turned off in power saving mode. Upon certain event which triggers the exit from the power saving mode, these clocks are turned on to perform graphic processing functions. The static clock control and large granularity of circuitry block degrade performance while reducing power consumption. Accordingly there is a need for a dynamic clock or voltage control and fine grain circuitry clock adjustment for power saving without degrading performance.

BRIEF DESCRIPTION OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

FIG. 3 is a flow chart diagram according to an embodiment of the present invention.

DETAILED DESCRIPTION OF THE INVENTION

Figure 1:
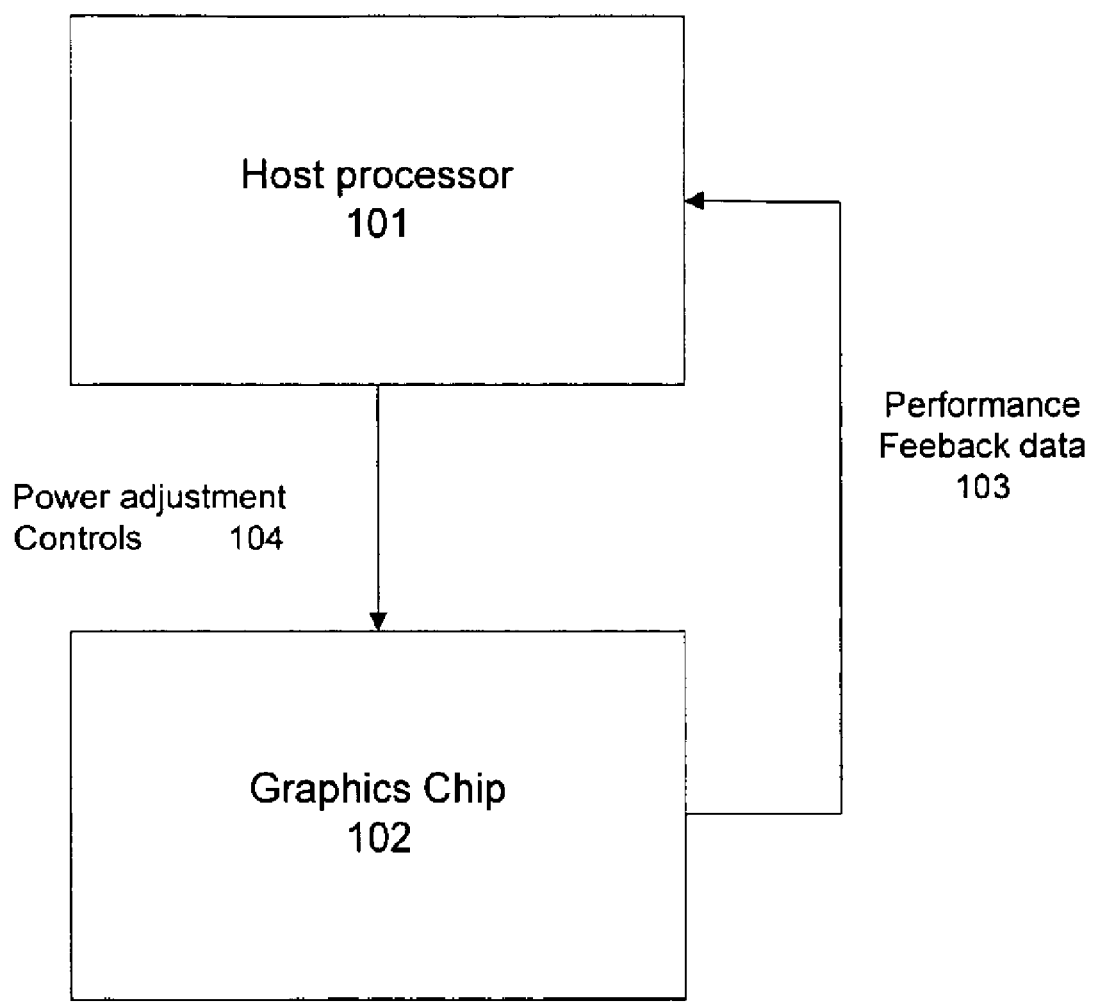
FIG. 1 is a system block diagram according to an embodiment of the present invention.

A single chip 3D and 2D compatible graphics processor consists of 3D and 2D graphics, image scalar and embedded memory. At the system level power is controlled by the following scheme. Power is automatically controlled with a feed back loop with the host processor based on the internal work load characterized by performance counters. The host automatically adjusts internal frequencies and or voltage level dynamically in real time to match the work load. The feedback loop allows tuning of frequency or voltage to control power dissipation. In addition to clock frequency tuning, voltage regulators internal or external to the chip can also be voltage scaled for dynamic power reduction. Voltage can ultimately be shutdown completely if the block is not needed.

In some examples, at the chip level power may be controlled by auto block level clock gating. Here, when there is no workload for a circuitry block, the clock to the circuitry block is gated off. In other examples, at the chip level power may be controlled by independent frequency scaling of vertex pipe and pixel pipe. This is a larger granularity scaling than block level. The vertex pipe is an aggregate of circuitry blocks that process vertex and polygons. The pixel pipe is an aggregate of circuitry blocks that process pixels. In graphics processing, one of these two groups may dominate the processing time at different time. The less dominating group may have its frequency scaled down. In still other examples, at the chip level power may be controlled by independent voltage scaling of vertex pipe and pixel pipe. The less dominating group may have its voltage scaled down. In yet still other examples, some blocks that are not used for the current processing operation may have their voltage completely shutdown to remove all power consumption (dynamic and static). For example, when running 2D applications, the major 3D blocks may be shutdown without loss of performance or functionality. As an example, if voltage scaling is performed, interfaces have to be designed accordingly. Voltage levels adapters or shifters may have to be used between blocks. When shutting down the voltage to a block, bypass circuitry may have to be enabled to allow blocks upstream and downstream to communicate with each other. As another example, inputs to blocks that are coming from shutdown blocks may have to be disabled in an inactive or stable state. This may be accomplished by using memories to keep last value or by gating cells to force inputs to an inactive level.

The chip outputs performance feedback data, derived from performance counters, to the host processor. The host processor uses a system performance algorithm to determine a hierarchical grouping of the circuitry blocks that optimizes performance. The host processor uses a power saving algorithm to determine appropriate clock gating, frequency scaling or voltage scaling of the hierarchical grouping of the circuitry blocks to reduce power consumption for multiple levels of low power controls.

FIG. 1 is a system block diagram according to an embodiment of the present invention. A single chip 3D and 2D graphics processor 102 consists of 3D and 2D graphics, image scalar and embedded memory. In an example, at the system level, power is controlled by the following scheme. Power is automatically controlled with a feed back loop 103 and 104 with the host processor 101 receiving performance feedback data 103 based on the internal work load characterized by performance counters within the graphics processor 102. The host processor 101 automatically adjusts internal frequencies or voltage levels dynamically in real time to match the work load via the power adjustment controls 104. The feedback loop allows tuning of frequency or voltage within the graphics processor 102 to control power dissipation.

Figure 2:
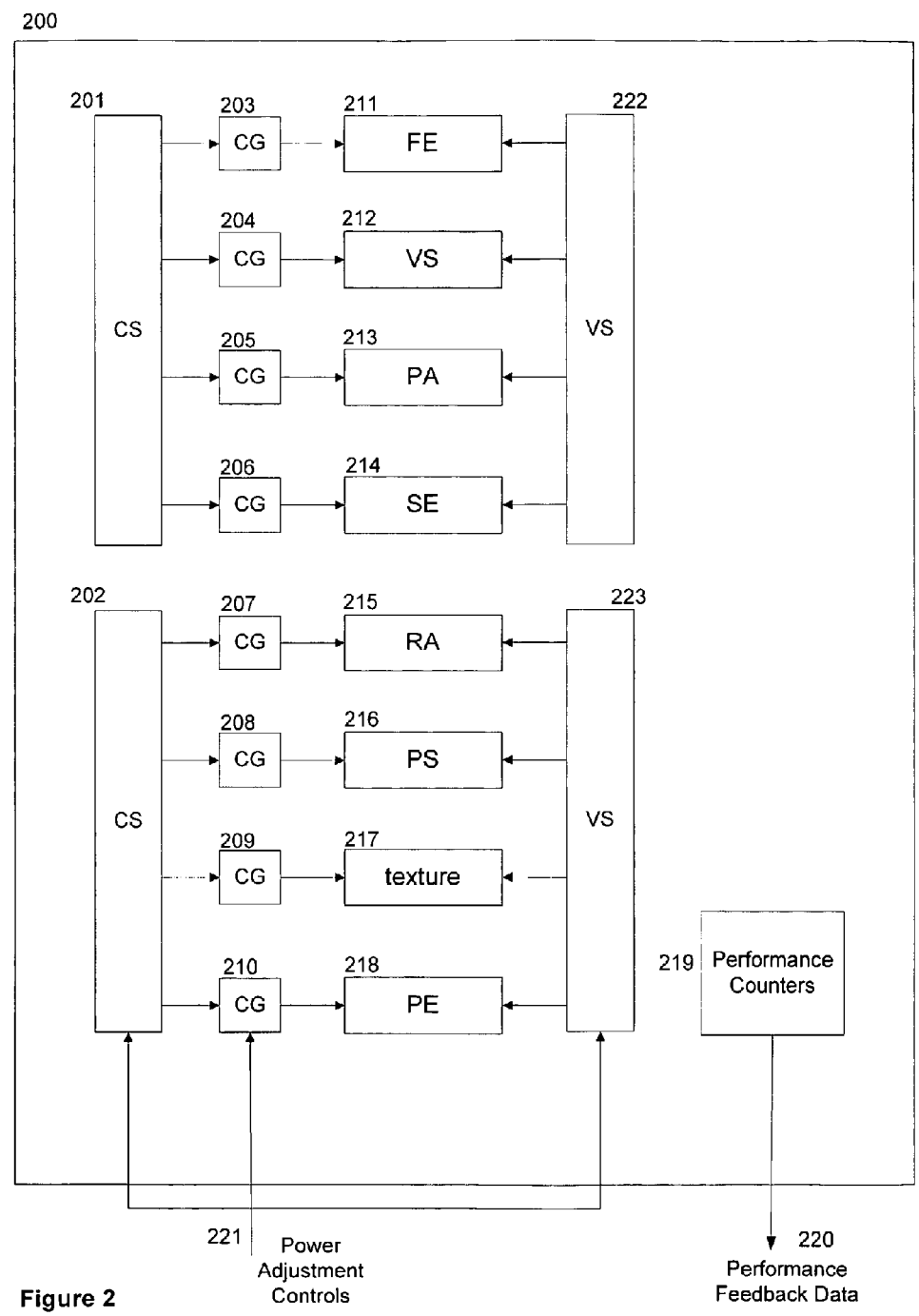
FIG. 2 is a circuit level block diagram according to an embodiment of the present invention.

FIG. 2 is a circuit level block diagram according to an embodiment of the present invention. The single chip 3D and 2D compatible graphics processor 200 comprises clock scaling circuitry 201 and 202 for adjusting clock frequency, clock gating circuitry 203-210 for turning clock on or off, voltage scaling circuitry 222 and 223 for adjusting voltage levels, and graphics processing circuitry blocks 211-218. In some examples, at the chip level, power is controlled by auto block level clock gating. For example, when there is no workload for a circuitry block, the clock to the circuitry block may be gated off. At the system level, the chip 200 outputs performance feedback data 220, derived from performance counters 219, to the host processor (not shown). The host processor uses a system performance algorithm to determine a hierarchical grouping of the circuitry blocks that optimizes performance. The host processor uses a power saving algorithm to determine appropriate clock gating, frequency scaling, or voltage scaling of the hierarchical grouping of the circuitry blocks to reduce power consumption for multiple levels of low power controls. In an example, the host processor uses a system performance algorithm to determine a hierarchical grouping of the circuitry blocks comprising a vertex pipe and a pixel pipe. The vertex pipe comprises circuitry blocks 211-214. The pixel pipe comprises circuitry blocks 215-218. The vertex pipe is an aggregate of circuitry blocks that process vertex and polygons. The pixel pipe is an aggregate of circuitry blocks that process pixels. In graphics processing, one of these two groups dominates the processing time at different time. The less dominating group may have its frequency or voltage scaled down without degrading overall system performance. The host processor determines independent frequency or voltage scaling of vertex pipe and pixel pipe dynamically in real time according to the real time performance feedback data 220 which represent workloads of the vertex pipe and the pixel pipe. This is a larger granularity scaling than block level. This is an example of the system performance algorithm. In other examples, various modifications or alterations may be made to the above-described implementation.

In other examples, the host processor determines power adjustment controls 221 dynamically in real time to adjust (e.g., scale, turn on, turn off, and the like) the clocks or voltages to circuitry blocks 211-218 for achieving multiple levels of power controls. The host processor monitors the performance feedback data while these adjustments are made so as to maintain performance level. For example, depending on the desired amount of total power saving, each circuitry block 211-218 may be allocated a share of the power saving. Various control signals of the power adjustment controls 221 may scale clocks to circuitry block 211-218 accordingly for achieving the allocated power saving of each circuitry block. In some other examples, control signals of the power adjustment controls 221 may scale voltage levels to circuitry block 211-218 accordingly for achieving the allocated power saving of each circuitry block. In still other examples, control signals of the power adjustment controls 221 may turn off clocks or voltages to one or more of circuitry block 211-218 accordingly for achieving the allocated power saving of each circuitry block. This is one example of power saving algorithm. Other modifications may be made obvious by the above description and implementations are not limited to the details provided above.

FIG. 3 is a flow chart diagram according to an embodiment of the present invention. The flow chart illustrates a method for processing. Here, a hierarchical grouping of one or more data processing blocks is determined from one or more performance measurements according to a system performance algorithm in real time. (301) For example, one or more performance measurements may represents processing work load, e.g. vertex processing, polygon processing, pixel processing, or the like. In an example, the dominating vertex processing work load may require 10 times more processing time than what is required by the pixel processing work load. In another example, the pixel processing work load may dominate. Various circuitries involved in vertex and polygon processing may be grouped in to a vertex pipe. Various circuitries involved in pixel processing may be grouped in to a pixel pipe. This is an example of the system performance algorithm. In other examples, various modifications or alterations may be made to the above-described implementation.

Corresponding to these hierarchical groupings, one or more clock signals or voltage levels may be adjusted (e.g., scaled, turned on, turned off, or the like) responsive to one or more performance feedback signal according to a power saving algorithm in real time. (302) For example, one or more performance feedback signal may reflect vertex processing work load being dominating over pixel processing work load by 10 times. In some examples, one or more clocks to the pixel pipe may be scaled down or turned off to reduce power consumption to 50% while slowing down pixel processing by 2 times. In other examples, one or more voltages to the pixel pipe may be scaled down or turned off to reduce power consumption to 30% while slowing down pixel processing by 3 times. In still other examples, one or more clocks and one or more voltages to the pixel pipe may be scaled down or turned off to reduce power consumption to 15% while slowing down pixel processing by 6 times. The host processor may determine the appropriate adjustments to the one or more clocks or voltages according to a desired level of power saving. This is one example of power saving algorithm. Other modifications may be made obvious by the above description and implementations are not limited to the details provided above.

With these adjustments, the one or more data processing blocks process data responsive to the one or more clock signals or voltage levels. (303) For example, the dominating vertex processing work load may require 10 times more processing time than what is required by the pixel processing work load prior to the adjustments of clock frequencies or voltage levels. Subsequent to the adjustments, pixel processing work load may require 6 times more processing time than before, but is still dominated by the vertex processing work load. Therefore the overall system performance is maintained while the power consumption may be reduced to a desired level. As such, the one or more performance feedback signals, generated responsive to the one or more performance measurements of the one or more data processing blocks in real time, reflect the updated processing work load. (304)

In one embodiment of the present invention, an apparatus for processing data comprises one or more clock or voltage adjustment circuit operable to adjust one or more clock signals or voltage levels; one or more data processing blocks operable to process data responsive to the one or more clock signals or voltage levels; and one or more performance feedback signals operable according to one or more performance measurements of the one or more data processing blocks in real time; wherein the one or more clock adjustment circuits are operable to adjust the one or more clock signals or voltage levels responsive to the one or more performance feedback signals in real time. Preferably a hierarchical grouping of the one or more data processing blocks is determined from the one or more performance measurements according to a system performance algorithm in real time; and the one or more clock or voltage level adjustment circuits are operable to adjust the one or more clock signals or voltage levels in the hierarchical grouping responsive to the one or more performance feedback signals according to a power saving algorithm in real time; whereby power consumption is minimized without reducing the system performance. Optionally the system performance algorithm and the power saving algorithm is implemented in an external processor. Optionally the external processor comprises one or more hardware circuit. Optionally the external processor comprises one or more software driver.

In one embodiment of the present invention, a computer readable medium including one or more data structures representing an electronic circuit wherein at least one data structure comprises a net-list; wherein the electronic circuit comprises one or more clock or voltage level adjustment circuits operable to adjust one or more clock signals or voltage levels; one or more data processing blocks operable to process data responsive to the one or more clock signals or voltage levels; and one or more performance feedback signals operable according to one or more performance measurements of the one or more data processing blocks in real time; wherein the one or more clock or voltage level adjustment circuits are operable to adjust the one or more clock signals or voltage levels responsive to the one or more performance feedback signals in real time.

In one embodiment of the present invention, a method for processing data comprises the steps of adjusting one or more clock signals or voltage levels according to one or more performance feedback signals in real time; processing data using one or more data processing blocks responsive to the one or more clock signals or voltage levels; and generating the one or more performance feedback signals responsive to one or more performance measurements of the one or more data processing blocks in real time. Preferably a hierarchical grouping of the one or more data processing blocks is determined from the one or more performance measurements according to a system performance algorithm in real time; and the one or more clock or voltage level adjustment circuits are operable to adjust the one or more clock signals in the hierarchical grouping responsive to the one or more performance feedback signals according to a power saving algorithm in real time; whereby power consumption is minimized without reducing the system performance. Optionally a dominant data processing block is determined according to the system performance algorithm; wherein the power consumption is reduced by reducing one or more frequency of the one or more clock signals or voltage levels except the clock signals or voltage levels corresponding to the dominant data processing block.

In one embodiment of the present invention, a method for designing a data processing apparatus comprises the steps of defining one or more clock or voltage level adjustment circuits operable to adjust one or more clock signals or voltage levels; defining one or more data processing blocks operable to process data responsive to the one or more clock signals or voltage levels; and defining one or more performance feedback signals operable according to one or more performance measurements of the one or more data processing blocks in real time; wherein the one or more clock or voltage levels adjustment circuits are operable to adjust the one or more clock signals or voltage levels responsive to the one or more performance feedback signals in real time. Preferably a hierarchical grouping of the one or more data processing blocks is determined from the one or more performance measurements according to a system performance algorithm in real time; and the one or more clock or voltage level adjustment circuits are operable to adjust the one or more clock signals or voltage levels in the hierarchical grouping responsive to the one or more performance feedback signals according to a power saving algorithm in real time; whereby power consumption is minimized without reducing the system performance.

In one embodiment of the present invention, a method for testing a data processing apparatus comprises the steps of adjusting one or more clock signals or voltage levels according to one or more power adjustment input signals in real time; processing data using one or more data processing blocks responsive to the one or more clock signals or voltage levels; and generating one or more performance feedback output signals responsive to one or more performance measurements of the one or more data processing blocks in real time; wherein the one or more power adjustment input signals are generated from an external tester according to the one or more performance feedback output signals by a test pattern look up method.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. Apparatus for processing data comprising:
   one or more clock adjustment circuits to adjust one or more clock signals;
   one or more voltage level adjustment circuits to adjust one or more voltage levels;
   a plurality of data processing blocks to process data responsive to the one or more clock signals and the one or more voltage levels; and
   one or more performance feedback signals operate according to one or more performance measurements of the plurality of data processing blocks in real time;
   wherein the one or more clock adjustment circuits to adjust the one or more clock signals, and the one or more voltage level adjustment circuits to adjust the one or more voltage levels, responsive to the one or more performance feedback signals in real time, and
   wherein a dominant data processing block is determined according to a system performance algorithm to minimize power consumption, the power consumption is reduced by lowering one or more frequencies of the one or more clock signals and lowering the one or more voltage levels of the plurality of data processing blocks without reducing system performance except for the clock signals and the voltage levels of the dominant data processing block.

2. The apparatus of claim 1 wherein the one or more plurality of data processing blocks are organized into at least one hierarchical group according to the system performance algorithm, the at least one hierarchical group is responsive to the one or more performance feedback signals according to a power saving algorithm in real time without reducing the system performance.

3. The apparatus of claim 1 wherein the dominant data processing block allows lowering one or more frequencies of the one or more clock signals and lowering the one or more voltage levels thereof with reduced system performance.

4. The apparatus of claim 2 wherein the system performance algorithm and the power saving algorithm is implemented in an external processor.

5. The apparatus of claim 4 wherein the external processor comprises one or more hardware circuit.

6. The apparatus of claim 4 wherein the external processor comprises one or more software driver.

7. A method for processing data comprising the steps of:
   adjusting one or more clock signals and one or more voltage levels;
   processing data using a plurality of data processing blocks responsive to the one or more clock signals and the one or more voltage levels; and generating the one or more performance feedback signals responsive to one or more performance measurements of the plurality of data processing blocks in real time, wherein adjusting one or more clock signals and one or more voltage levels are responsive to the one or more performance feedback signals in real time, and wherein a dominant data processing block is determined according to a system performance algorithm to minimize power consumption, the power consumption is reduced by lowering one or more frequencies of the one or more clock signals and lowering the one or more voltage levels of the plurality of data processing blocks without reducing system performance except for the clock signals and the voltage levels of the dominant data processing block.

8. The method of claim 7 wherein the one or more plurality of data processing blocks are organized into at least one hierarchical group according to the system performance algorithm, the at least one hierarchical group is responsive to the one or more performance feedback signals according to a power saving algorithm in real time without reducing the system performance.

9. The method of claim 7 wherein the dominant data processing block allows lowering one or more frequencies of the one or more clock signals and lowering the one or more voltage levels thereof with reduced system performance.

10. A method for designing a data processing apparatus comprising the steps of:

defining one or more clock adjustment circuits to adjust one or more clock signals and one or more voltage level adjustment circuits to adjust one or more voltage levels;

defining a plurality of data processing blocks to process data responsive to the one or more clock signals and the one or more voltage levels; and defining one or more performance feedback signals operate according to one or more performance measurements of the plurality of data processing blocks in real time;

wherein the one or more clock adjustment circuits to adjust the one or more clock signals, and the one or more voltage level adjustment circuits to adjust the one or more voltage levels, responsive to the one or more performance feedback signals in real time, and wherein a dominant data processing block is determined according to a system performance algorithm to minimize power consumption, the power consumption is reduced by lowering one or more frequencies of the one or more clock signals and lowering the one or more voltage levels of the plurality of data processing blocks without reducing system performance except for the clock signals and the voltage levels of the dominant data processing block.

11. The method of claim 10 wherein the one or more plurality of data processing blocks are organized into at least one hierarchical group according to the system performance algorithm, the at least one hierarchical group is responsive to the one or more performance feedback signals according to a power saving algorithm in real time without reducing the system performance.

12. The method of claim 10 wherein the dominant data processing block allows lowering one or more frequencies of the one or more clock signals and lowering the one or more voltage levels thereof with reduced system performance.

13. A method for testing a data processing apparatus comprising the steps of:

adjusting one or more clock signals and one or more voltage levels according to one or more power adjustment input signals in real time;

processing data using a plurality of data processing blocks responsive to the one or more clock signals and the one or more voltage levels; and generating one or more performance feedback output signals responsive to one or more performance measurements of the plurality of data processing blocks in real time;

wherein the one or more power adjustment input signals are generated from an external tester according to the one or more performance feedback output signals by a test pattern look up method, wherein a dominant data processing block is determined according to a system performance algorithm to minimize power consumption, the power consumption is reduced by lowering one or more frequencies of the one or more clock signals and lowering the one or more voltage levels of the plurality of data processing blocks without reducing system performance except for the clock signals and the voltage levels of the dominant data processing block.

14. The method of claim 13 wherein the one or more plurality of data processing blocks are organized into at least one hierarchical group according to the system performance algorithm, the at least one hierarchical group is responsive to the one or more performance feedback signals according to a power saving algorithm in real time without reducing the system performance.

15. The method of claim 13 wherein the dominant data processing block allows lowering one or more frequencies of the one or more clock signals and lowering the one or more voltage levels thereof with reduced system performance.

16. A non-transitory computer readable storage medium including one or more data structures representing an electronic circuit:

wherein at least one data structure comprises a net-list;

wherein the electronic circuit comprises:

one or more clock adjustment circuits to adjust one or more clock signals;

one or more voltage level adjustment circuits to adjust one or more voltage levels;

a plurality of data processing blocks to process data responsive to the one or more clock signals and the one or more voltage levels; and one or more performance feedback signals operate according to one or more performance measurements of the plurality of data processing blocks in real time;

wherein the one or more clock adjustment circuits to adjust the one or more clock signals and the one or more or voltage level adjustment circuits to adjust the one or more voltage levels responsive to the one or more performance feedback signals in real time, wherein a dominant data processing block is determined according to a system performance algorithm to minimize power consumption, the power consumption is reduced by lowering one or more frequencies of the one or more clock signals and lowering the one or more voltage levels of the plurality of data processing blocks without reducing system performance except for the clock signals and the voltage levels of the dominant data processing block.

17. The non-transitory computer readable storage medium of claim 16 wherein the one or more plurality of data processing blocks are organized into at least one hierarchical group according to the system performance algorithm, the at least one hierarchical group is responsive to the one or more performance feedback signals according to a power saving algorithm in real time without reducing the system performance.

18. The non-transitory computer readable storage medium of claim 16 wherein the one or more plurality of data processing blocks are organized into at least one hierarchical group according to the system performance algorithm, the at least one hierarchical group is responsive to the one or more performance feedback signals according to a power saving algorithm in real time without reducing the system performance.

* * * * *

UNITED STATES PATENT AND TRADEMARK OFFICE
CERTIFICATE OF CORRECTION

PATENT NO.        : 8,161,312 B2  
APPLICATION NO.   : 12/477652  
DATED             : April 17, 2012  
INVENTOR(S)       : Mike M. Cai et al.

Page 1 of 1

It is certified that error appears in the above-identified patent and that said Letters Patent is hereby corrected as shown below:

On the Title Page item [63] should be added under Domestic Application Priority Data:

This application is a continuation of 11/450,737 06/09/2006

Signed and Sealed this
Twenty-sixth Day of March, 2013

Teresa Stanek Rea
*Acting Director of the United States Patent and Trademark Office*